United States Patent
Kang et al.

(10) Patent No.: US 9,710,747 B2
(45) Date of Patent: Jul. 18, 2017

(54) NEUROMOPHIC SYSTEM AND CONFIGURATION METHOD THEREOF

(71) Applicant: Samsung Electronics Co., Ltd., Suwon-Si, Gyeonggi-Do (KR)

(72) Inventors: Daehwan Kang, Seoul (KR); Kyung-chang Ryoo, Seongnam-si (KR); Hyun Goo Jun, Seongnam-si (KR); Hongsik Jeong, Seongnam-si (KR); JaeHee Oh, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 422 days.

(21) Appl. No.: 14/328,359

(22) Filed: Jul. 10, 2014

(65) Prior Publication Data
US 2015/0039547 A1 Feb. 5, 2015

(30) Foreign Application Priority Data

Aug. 5, 2013 (KR) .................. 10-2013-0092693

(51) Int. Cl.
*G06N 3/063* (2006.01)
*G06N 3/04* (2006.01)
(52) U.S. Cl.
CPC .............. *G06N 3/063* (2013.01); *G06N 3/049* (2013.01)
(58) Field of Classification Search
None
See application file for complete search history.

(56) References Cited

U.S. PATENT DOCUMENTS

| | | | |
|---|---|---|---|
| 7,092,923 B2 | 8/2006 | Arima | |
| 7,978,510 B2 | 7/2011 | Modha et al. | |
| 8,111,494 B2 | 2/2012 | Pickett et al. | |
| 8,275,728 B2 | 9/2012 | Pino | |
| 8,311,965 B2 | 11/2012 | Breitwisch et al. | |
| 8,332,340 B2 | 12/2012 | Snider | |
| 8,433,665 B2 | 4/2013 | Tang et al. | |
| 8,447,714 B2 | 5/2013 | Breitwisch et al. | |
| 2003/0098476 A1 | 5/2003 | Arima | |
| 2010/0220523 A1 | 9/2010 | Modha et al. | |
| 2010/0277232 A1 | 11/2010 | Snider | |
| 2010/0299297 A1 | 11/2010 | Breitwisch et al. | |
| 2011/0106742 A1 | 5/2011 | Pino | |

(Continued)

FOREIGN PATENT DOCUMENTS

JP 2010146514 A 7/2010

OTHER PUBLICATIONS

G. Indiveri et al. "Neuromorphic Silicon Neuron Circuits", Frontiers in Neuroscience review article, May 31, 2011, vol. 5, Article 73, pp. 1-23.

*Primary Examiner* — Alan Chen
(74) *Attorney, Agent, or Firm* — Harness, Dickey & Pierce, P.L.C.

(57) ABSTRACT

A method of generating neuron spiking pulses in a neuromorphic system is provided which includes floating one or more selected bit lines connected to target cells, having a first state, from among a plurality of memory cells arranged at intersections of a plurality of word lines and a plurality of bit lines; and stepwise increasing voltages applied to unselected word lines connected to unselected cells, having a second state, from among memory cells connected to the one or more selected bit lines other than the target cells having the first state.

16 Claims, 11 Drawing Sheets

| | Bit Line | | Word Line | |
|---|---|---|---|---|
| | Sel | Unsel | Sel | Unsel |
| ①All BL; all "1" Sel BL; all "0" | H | H/2 | 0 | H/2 |
| ②Target cell "1" | H | H/2 | 0 | H/2 |
| ③Sel BL & Uns WL Voltage sweep | F (floating) | H/2 | 0 | 0 → H |
| ④Single Read Pulse along Sel BL and Sel WL | H | H/2 | 0 | H/2 |
| ⑤ ③~④ iteration | Until an output spiking is detected. | | | |

(56) References Cited

U.S. PATENT DOCUMENTS

| | | |
|---|---|---|
| 2011/0119214 A1 | 5/2011 | Breitwisch et al. |
| 2011/0140762 A1* | 6/2011 | Jiang .................... C23C 14/081 327/365 |
| 2011/0181347 A1 | 7/2011 | Pickett et al. |
| 2012/0011090 A1 | 1/2012 | Tang et al. |
| 2012/0084240 A1 | 4/2012 | Esser et al. |
| 2012/0084241 A1 | 4/2012 | Friedman et al. |
| 2012/0317063 A1 | 12/2012 | Sim et al. |
| 2014/0063925 A1* | 3/2014 | Friedman ........... G11C 13/0004 365/163 |

\* cited by examiner

Related Art

Related Art

Related Art

Related Art

|  | Bit Line | | Word Line | |
| --- | --- | --- | --- | --- |
|  | Sel | Unsel | Sel | Unsel |
| ①All BL; all "1"<br>Sel BL; all "0" | H | H/2 | 0 | H/2 |
| ②Target cell "1" | H | H/2 | 0 | H/2 |
| ③Sel BL & Uns WL<br>Voltage sweep | F<br>(floating) | H/2 | 0 | 0 → H |
| ④Single Read Pulse<br>along Sel BL and Sel WL | H | H/2 | 0 | H/2 |
| ⑤ ③~④ iteration | Until an output spiking is detected. | | | |

NEUROMOPHIC SYSTEM AND CONFIGURATION METHOD THEREOF

CROSS-REFERENCE TO RELATED APPLICATIONS

A claim for priority under 35 U.S.C. §119 is made to Korean Patent Application No. 10-2013-0092693 filed Aug. 5, 2013, in the Korean Intellectual Property Office, the entire contents of which are hereby incorporated by reference in their entirety.

BACKGROUND

The inventive concepts described herein relate to a non-volatile memory device and a method of configuring a neuromorphic system using the same.

A semiconductor memory device is typically volatile or nonvolatile. A volatile memory device supports fast read and write speeds, while it loses contents stored therein when a power to the volatile memory device is interrupted. The nonvolatile memory device retains contents stored therein although a power to the nonvolatile memory device is interrupted. Therefore, the nonvolatile memory device is used to store contents that must be retained regardless of whether a power is supplied to the nonvolatile memory device.

In general, a flash memory device is utilized as a high-integration and mass nonvolatile memory device. In addition, the high-integration and mass nonvolatile memory device is implemented by a ferroelectric random access memory (ferroelectric RAM or FRAM) using a ferroelectric capacitor, a magnetic random access memory (magnetic RAM or MRAM) using a Tunneling magneto-resistive (TMR) film, a phase change memory device using Chalcogenide alloys, a resistive random access memory (resistive RAM or RRAM) using a resistive material film as a data storage medium, etc.

A phase change memory cell utilizes a material that is switched between different structured states indicating different electrical read characteristics. For example, there are known memory devices fabricated using a Chalcogenide material (hereinafter, referred to as GST material) being Germanium-Antimony-Tellurium (GeSbTe). The GST material has an amorphous state showing a relatively high resistivity and a crystalline state showing a relatively low relativity. That is, data corresponding to the crystalline state or the amorphous state is stored in the phase change memory cell by heating the GST material. Heating conditions (e.g., level, duration, etc.) typically determine whether the GST material remains at the amorphous or crystalline state. A high resistivity indicates a written logical value of '1', and a low resistivity indicates a written logical value of '0'. Such logical values are sensed by measuring a resistivity of the GST material.

A neuromorphic system means a system that mimics the manner in which a brain processes data by simulating a neuron of a human brain using various elements.

FIG. 1 is a diagram schematically illustrating a process in which a neuron receives an external signal and a process in which a neuron amplifies an input signal and transfers the input signal to an adjacent neuron. A synapse potential Vsyn being an electrical pulse form of the input signal is received at a dendrite of a pre-synapse neuron. At this time, if a sum of several synapse potentials Vsyn is higher than a threshold potential Vth, the neuron generates an action potential Vact and transfers the action potential Vact to a post-synapse neuron. This is referred to as neuron spiking.

FIG. 2 is a diagram showing voltages of pre-synapse and post-synapse neurons. FIG. 3 is a diagram showing a STDP (Spike-Timing Dependent Plasticity) algorithm.

STDP (Spike-Timing Dependent Plasticity) is a basic algorithm that adjusts the strength of connections between neurons, which is crucial for memory and learning. Neuron spiking generated through the above-described process is provided to a post-synapse neuron. The strength of connections between neurons that determines memory and learning of the human brain is determined by a time interval between an action potential of a pre-synapse neuron and an action potential of a post synapse neuron. If the time interval is negative, a long-term depression (LTD) phenomenon, where the strength of connections between neurons becomes weak, occurs. If the time interval is positive, a long-term potentiation (LTP) phenomenon, where the strength of connections between neurons becomes strong, occurs.

In general, the neuron spiking and STDP are simulated using a semiconductor element including a CMOS logic. In this case, since a lot of power is consumed and a wide area is required to implement a synapse element, it is typically difficult to highly integrate the synapse element.

SUMMARY

At least one example embodiment of the inventive concept is directed to providing a method of generating neuron spiking pulses in a neuromorphic system which comprises floating one or more selected bit lines connected to target cells, having a first state, from among a plurality of memory cells arranged at intersections of a plurality of word lines and a plurality of bit lines; and stepwisely increasing voltages applied to unselected word lines connected to unselected cells, having a second state, from among memory cells connected to the one or more selected bit lines other than the target cells having the first state.

In example embodiments, the method further comprises setting cells connected to unselected bit lines other than the one or more selected bit lines to the first state before increasing the voltages.

In example embodiments, the method further comprises setting all cells connected to the one or more selected bit lines to the second state and then setting the target cells to the first state.

In example embodiments, the method further comprises detecting whether the neuron spiking pulses are output from selected word lines connected to the target cells.

In example embodiments, the increasing and the detecting are iterated until one or more neuron spiking pulses are generated.

In example embodiments, floating the one or more selected bit lines and increasing the voltages applied to the unselected word lines are performed simultaneously or, alternatively, contemporaneously.

In example embodiments, the first state is different from the second state.

In example embodiments, the memory cells are phase change memory cells.

In example embodiments, the first state is an amorphous state of a phase change material included in each memory cell, and the second state is a crystal state of the phase change material.

Another example embodiment of the inventive concept is directed to providing a method of implementing an STDP (Spike-Timing Dependent Plasticity) algorithm of a neuromophic system including a synaptic circuit having a first memory cell and a second memory cell, the method comprising providing a first signal to a first bit line connected to a first memory cell and providing a second signal to a second bit line connected to a second memory cell with a time interval with respect to the first signal.

In example embodiments, the first and second memory cells are phase change memory cells.

In example embodiments, a level of the second signal is increased or decreased according to the time interval such that a resistance of the second memory cell is set to be larger than the resistance of the first memory cell.

Still another example of embodiments of the inventive concept is directed to provide a neuromophic system implementing method which comprises floating one or more selected bit lines connected to target cells, having a first state, from among a plurality of memory cells arranged at intersections of a plurality of word lines and a plurality of bit lines; stepwisely increasing voltages applied to unselected word lines connected to unselected cells having a second state from among cells connected to the one or more selected bit lines other than the target cells having the first state, to generate neuron spiking pulses; and providing first and second neuron spiking pulses selected from the neuron spiking pulses to a synaptic circuit including first and second memory cells with a time interval, to implement an STDP (Spike-Timing Dependent Plasticity) algorithm.

In example embodiments, the memory cells are phase change memory cells.

In example embodiments, the first state is an amorphous state of a phase change material included in each memory cell, and the second state is a crystal state of the phase change material.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
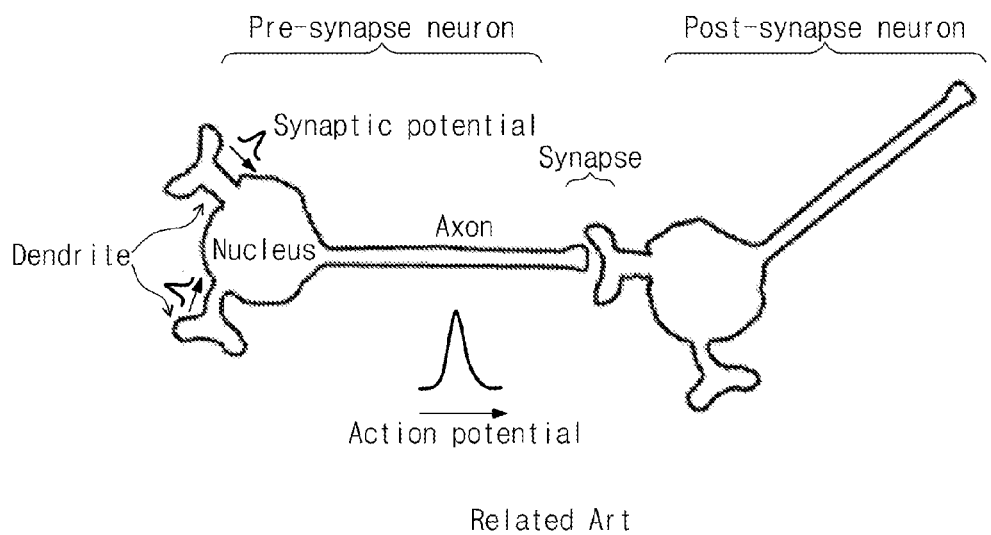
FIG. 1 is a diagram schematically illustrating a process in which a neuron receives an external signal and a process in which a neuron amplifies an input signal and transfers it to an adjacent neuron.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "example" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Embodiments of the inventive concepts are described using a phase change memory device. However, the inventive concept is not limited thereto. For example, the inventive concepts are applicable to all nonvolatile memory devices (e.g., a resistive RAM (RRAM), a magnetic RAM (MRAM), etc.) using a resistor.

Figure 4:
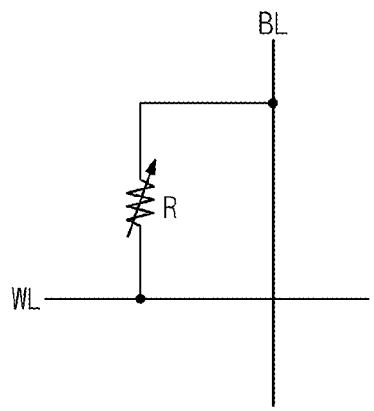
FIG. 4 is a circuit diagram schematically illustrating a memory cell of a phase change memory device.

FIG. 4 is a circuit diagram schematically illustrating a memory cell of a phase change memory device. Referring to FIG. 4, a phase change memory cell includes a phase change element R connected to a bit line BL and a word line WL. Although not shown in FIG. 4, the phase change memory cell may further comprise a bi-directional diode for reducing or preventing a current from being leaked. Data is written to the phase change memory cell that is not equipped with a selection element by applying voltages to the bit line BL and the word line WL.

Figure 5:
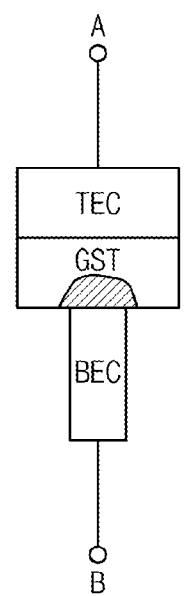
FIG. 5 is a diagram schematically illustrating a structure of a memory cell of a phase change memory device.

FIG. 5 is a diagram schematically illustrating a structure of a memory cell of a phase change memory device. Referring to FIG. 5, a phase change memory cell includes a GST material. The GST material is connected between a top electrode TEC and a bottom electrode BEC. The top electrode TEC is connected to a bit line (not shown), and the bottom electrode BEC is connected to a word line (not shown).

Figure 6:
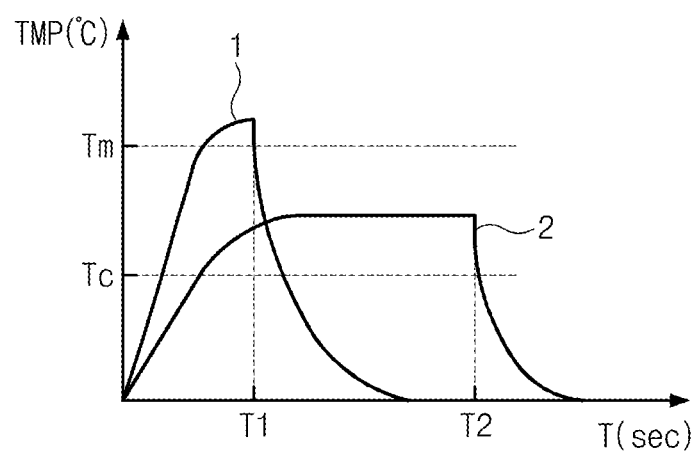
FIG. 6 is a graph for describing a characteristic of a phase change material.

FIG. 6 is a graph for describing a characteristic of a phase change material. In FIG. 6, a reference numeral 1 indicates a condition where a phase change material is set to an amorphous state, and a reference numeral 2 indicates a condition where the phase change material is set to a crystalline state.

Referring to FIG. 6, the GST material is set to the amorphous state by heating the GST material at a temperature higher than a melting temperature Tm during a time T1 through supplying of a current to the GST material, and rapidly quenching the GST material. The amorphous state is referred to as a reset state and stores data '1'.

On the other hand, the GST material is set to the crystal state by heating the GST material at a temperature higher than a crystallization temperature Tc and lower than the melting temperature Tm during a time T2 longer than T1 by supplying a current to the GST material and slowly cooling the GST material. The crystal state is referred to as a set state and stores data '0'. A resistance of the memory cell is variable according to an amorphous volume of a phase change material. A resistance of the memory cell is highest when the phase change material is in the amorphous state and lowest when the phase change material is in a crystalline state.

In the description that follows, an operation of switching a phase change memory cell from a low resistance state (e.g., a set state) to a high resistance state (e.g., a reset state) is referred to as a program operation.

Figure 7:
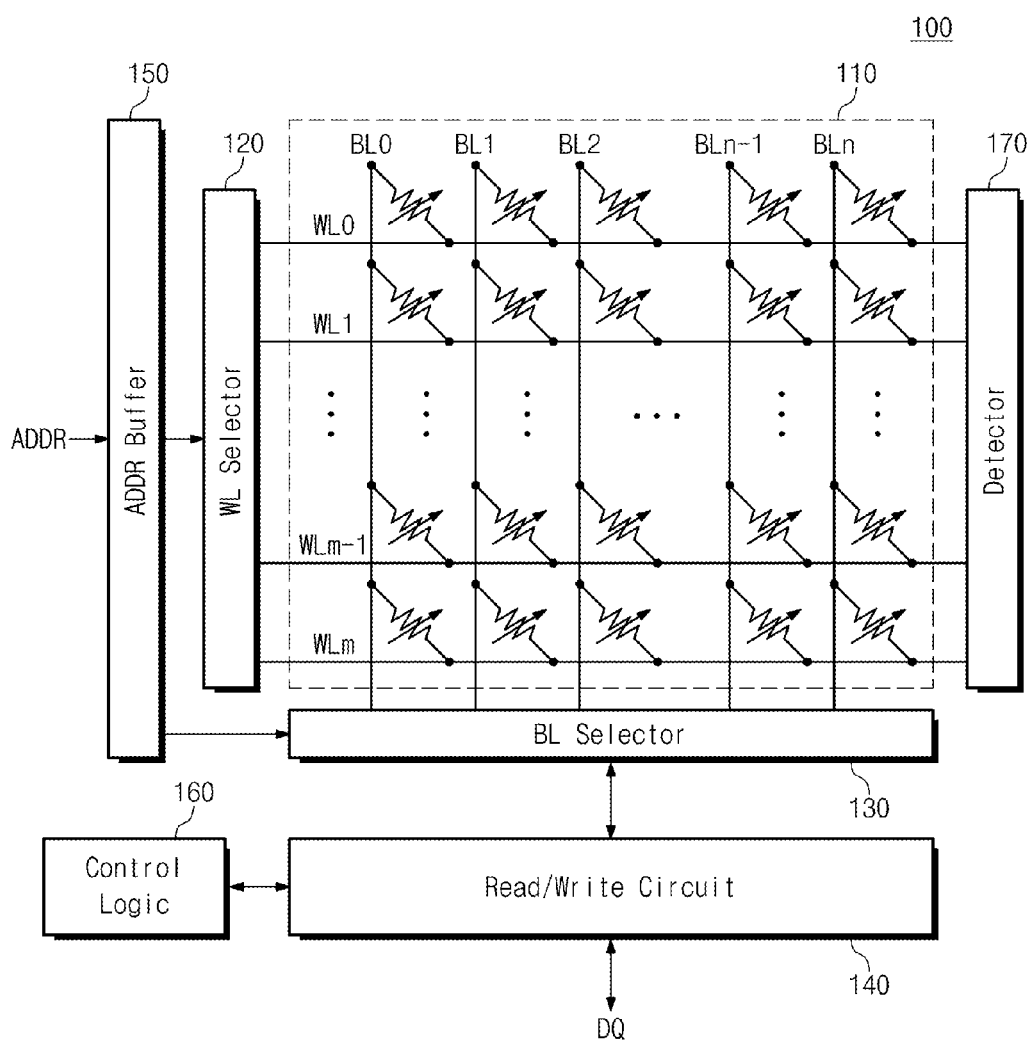
FIG. 7 is a block diagram schematically illustrating a phase change memory device according to an example embodiment.

FIG. 7 is a block diagram schematically illustrating a phase change memory device according to an example embodiment. Referring to FIG. 7, a phase change memory device 100 may include a cell array 110, a word line selector 120, a bit line selector 130, a read/write circuit 140, an address buffer 150, control logic 160, and a detector 170.

According to an example embodiment, the cell array 110 includes a plurality of phase change memory cells, which are configured to have a similar (or alternatively the same) structure as the structure described with reference to FIG. 4. The cell array 110 includes (m+1) rows and (n+1) columns to store data, where 'm' and 'n' are integers. A bias for accessing the memory cells is provided to a phase change element of each memory cell through a word line and a bit line. For ease of description, it is assumed that a program voltage is provided to a memory cell through a word line. However, the inventive concept is not limited thereto. For example, a program voltage may be provided to a memory cell through a bit line.

According to an example embodiment, the word line selector 120 decodes a row address provided from the address buffer 150 to select one of the word lines WL0 to WLm. The word line selector 120 may provide the selected word line with a word line voltage provided from a voltage generator (not shown).

According to an example embodiment, the bit line selector 130 selects one or more bit lines of the bit lines BL0 to BLn based on a column address. A bit line selected by the bit line selector 130 may be connected to the read/write circuit 140.

According to an example embodiment, the read/write circuit 140 provides a bit line bias for accessing a selected memory cell according to a control of the control logic 150. The read/write circuit 140 may provide a bit line voltage for writing input data to the cell array 110 or sensing data written to the cell array 110.

According to an example embodiment, the control logic 160 performs program and erase operations on the selected memory cell in response to a command provided from an external device. The control logic 160 controls the read/write circuit 140 and the address buffer 150 to access the selected memory.

As will be described later, the detector 170 is configured to detect whether a neuron spiking pulse is generated from the cell array 110.

Figure 8:
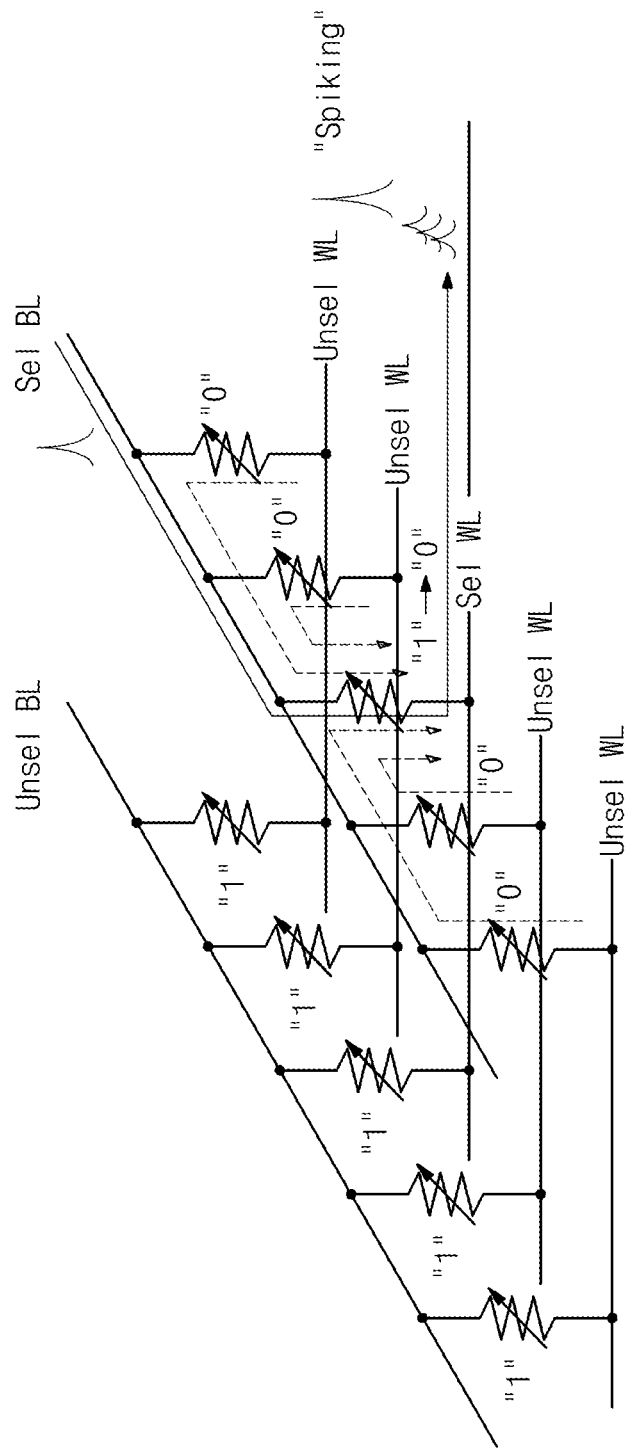
FIG. 8 is a diagram schematically illustrating a neuron spiking generating method performed at a cell array 110 shown in FIG. 7, according to an example embodiment.
Figures 9, 10:
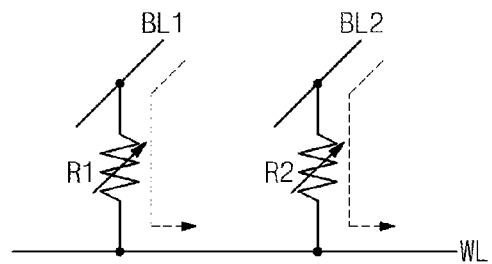
FIG. 9 is a table showing voltages of word lines and bit lines when a neuron spiking is generated, according to an example embodiment.
FIG. 10 is a diagram schematically illustrating an emulated synapse circuit of a synapse that transfers a signal between a pre-synapse neuron and a post-synapse neuron shown in FIG. 1, according to an example embodiment.

FIG. 8 is a diagram schematically illustrating a neuron spiking generating method performed at a cell array 110 shown in FIG. 7. FIG. 9 is a table showing voltages of word lines and bit lines when a neuron spiking is generated, according to an example embodiment.

Referring to FIGS. 8 and 9, a plurality of phase change memory cells may be disposed at intersections of a plurality of word lines and a plurality of bit lines. A top electrode TEC of a phase change memory cell may be connected to a bit line, and a bottom electrode BEC thereof may be connected to a word line. Below, a particular memory cell from which a neuron spiking is to be generated is referred to as a target cell.

According to an example embodiment, a set pulse voltage is applied to cells connected to a selected bit line, connected to the target cell, from among the bit lines so as to be set to a second state. A reset pulse voltage is applied to cells connected to the remaining unselected bit lines of the bit lines other than the selected bit line so as to be set to a first state. A target cell from among the memory cells connected to the selected bit line is set to the first state. At this time, the first state is a reset state indicating data '1', and the second state is a set state indicating data '0'.

According to an example embodiment, the set pulse voltage is applied to the selected bit line such that all memory cells connected to the selected bit line are set to the set state (e.g., data '0') being a low resistance state (①). Voltages applied to the unselected bit lines are maintained the same as voltages applied to unselected word lines, and a ground voltage is applied to a selected word line connected to the target cell. When the reset pulse voltage is applied to the selected bit line, a current flows from the selected bit line to the target cell. At this time, a state of the target cell is switched into the reset state (e.g., data '1') being a high resistance state (②).

Alternatively, according to an example embodiment, in the event that all cells connected to the selected bit line are at the reset state (e.g., data '1'), a voltage applied to the selected word line connected to the target cell is maintained the same as that applied to the selected bit line, and then a ground voltage is applied to remaining unselected word lines. If the set pulse voltage is applied to the selected bit line, states of remaining unselected cells of cells connected to the selected bit line other than the target cell are switched into the set state (e.g., data '0').

According to an example embodiment, an electrical path may be formed between the unselected word lines and the selected word line through the selected bit line such that the target cell generates a neuron spiking pulse. Thus, voltages applied to the selected word lines and the selected bit line are gradually increased (③). For example, voltages may be applied to the unselected word lines and a voltage may be applied to the selected bit line. Voltages applied to the unselected word lines may be higher than a sum of a voltage applied to the selected bit line and voltage drops ΔV by unselected cells, according to an example embodiment. This is to reduce or prevent a current leakage into the unselected word lines. Although not shown, a phase change memory cell shown in FIG. 8 may further comprise a diode for reducing or preventing a current leakage. Alternatively, the selected bit line is floated, and voltages applied to the unselected word lines are stepwisely increased. In example embodiments, the selected bit line may be floated by selectively turning off a transistor (not shown) in a bit line selector 130 (refer to FIG. 7) connected to a plurality of bit lines. Although voltages applied to the unselected word lines are stepwisely increased with the selected bit line being floated, a current is not leaked into the unselected word lines because an electrical path is formed between the unselected word lines and the selected word line through the selected bit line.

According to an example embodiment, after a voltage for generating a neuron spiking is applied to the unselected word lines and the selected bit line, or after an operation of floating the selected bit line and an operation of applying a voltage for generation of the neuron spiking to the unselected word lines are performed, an operation of detecting is performed whether a neuron spiking pulse is generated from the selected word line (④). The detection may be performed by a detector 170 shown in FIG. 7. The fact that a neuron spiking pulse is generated from the target cell may mean that the target cell is switched from a reset state (e.g., data '1') to a set state (e.g., data '0'). That is, in the event that a cell array 110 (refer to FIG. 7) is formed of phase change memory cells, the fact that a neuron spiking pulse is generated from the target cell may mean a transition from an amorphous state to a crystalline state.

In the event that no neuron spiking pulse is detected, voltages applied to the unselected word lines and the selected bit line may be increased by a desired (or, alternatively, predetermined) increment. In a case where no neuron spiking pulse is detected with the selected bit line being floated, voltages applied to the unselected word lines may be increased by a desired (or, alternatively, predetermined) increment. At this time, as described above, voltages applied to the unselected word lines may be set to be higher than a sum of a voltage applied to the selected bit line and voltage drops ΔV by unselected cells. Or, in the event that the selected bit line is floated, the above-described condition may not be required where voltages applied to the unselected word lines may not have to be set to be higher than a sum of the voltage applied to the selected bit line and voltage drops ΔV by the unselected cells. This is performed to reduce or prevent a current leakage into the unselected word lines and to enable a current to flow into the selected word line.

In example embodiments, the voltages applied to the unselected word lines and the selected bit line are stepwisely increased in a step pulse manner. Alternatively, in the event that the selected bit line is floated, the voltages applied to the unselected word lines are stepwisely increased in a step pulse manner. The detector 170 detects whether a neuron spiking pulse is generated. According to an example embodiment, the above-described operations are iterated until the neuron spiking pulse is generated (⑤).

Figure 11:
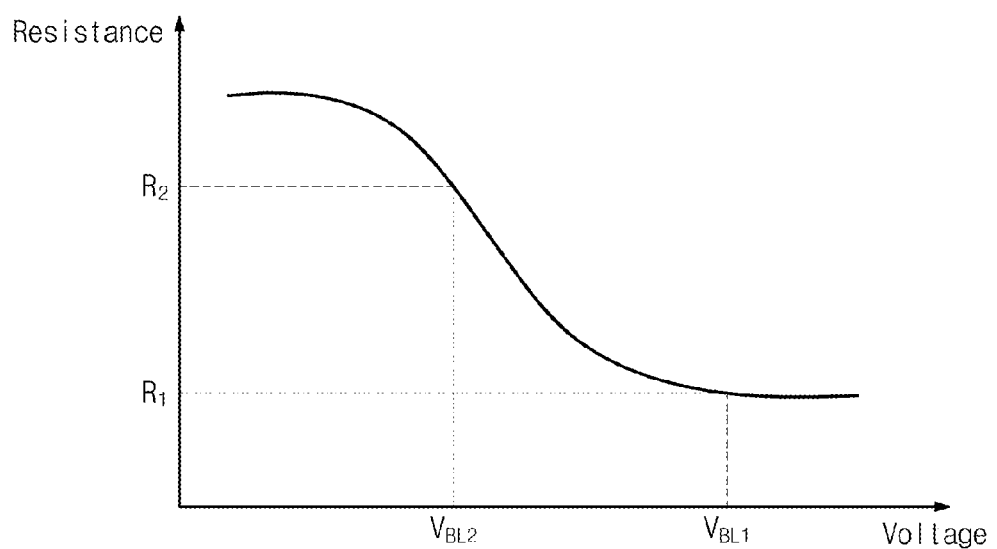
FIG. 11 is a graph showing a voltage-resistance characteristic of a phase change memory cell forming a synapse circuit shown in FIG. 10, according to an example embodiment.

FIG. 10 is a diagram schematically illustrating an emulated synapse circuit of a synapse that transfers a signal between a pre-synapse neuron and a post-synapse neuron shown in FIG. 1. FIG. 11 is a graph showing a voltage-resistance characteristic of a phase change memory cell forming a synapse circuit shown in FIG. 10.

Referring to FIG. 10, a synapse circuit may include two phase change memory cells. Although the synapse circuit is described using a phase change memory cell, the synapse circuit may be implemented using any nonvolatile memory device (e.g., a resistive RAM (RRAM), a magnetic RAM (MRAM), etc.) using a memory resistor. Each phase change memory cell includes a phase change element R1 connected to a bit line BL1 and a phase change element R2 connected to a bit line BL2.

Figure 2:
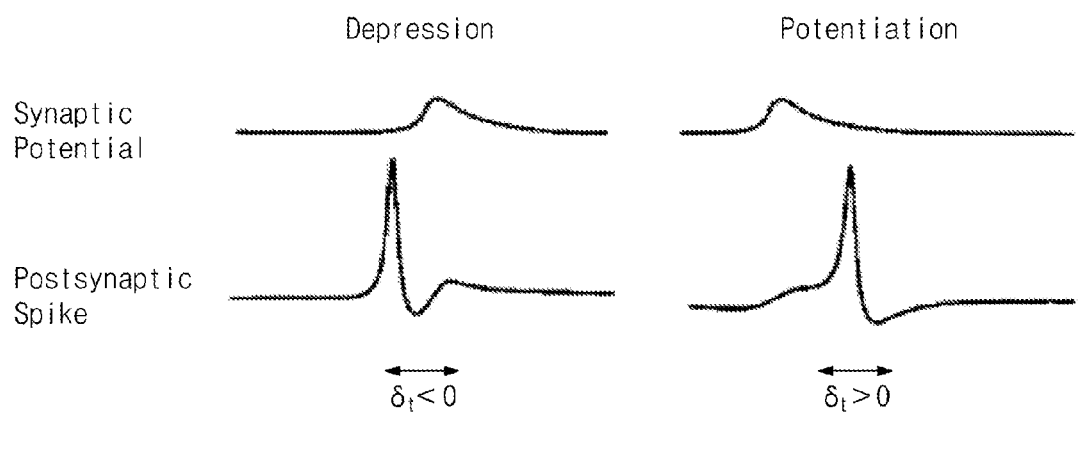
FIG. 2 is a diagram showing voltages of pre-synapse and post-synapse neurons.
Figure 3:
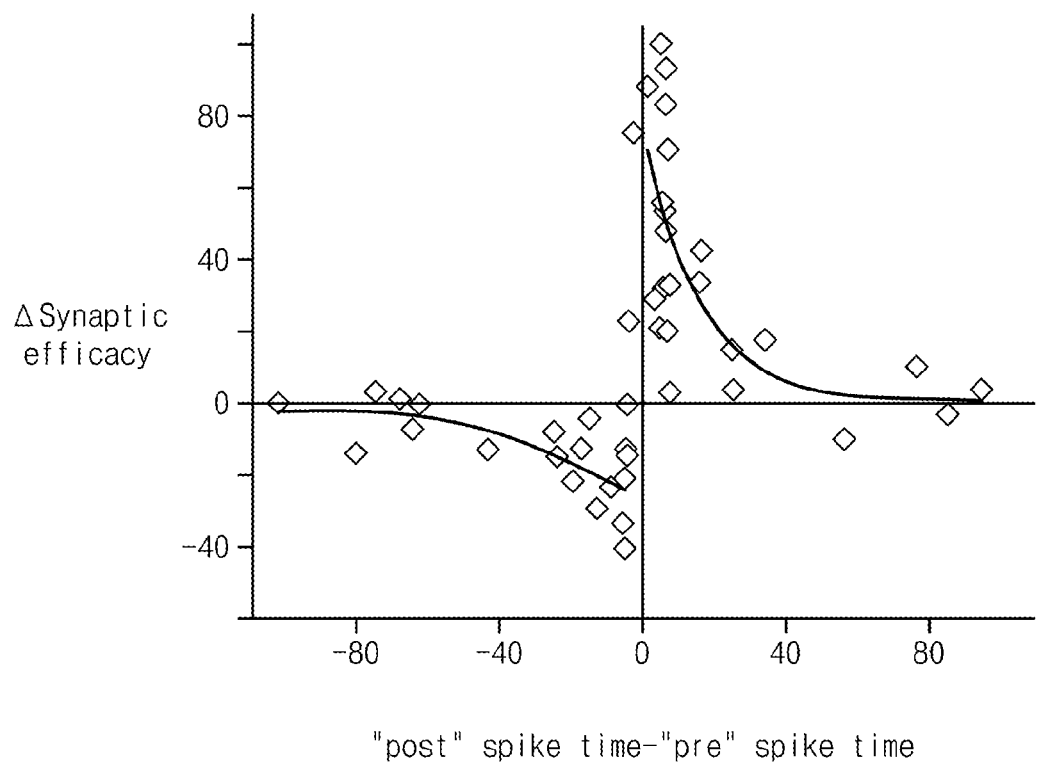
FIG. 3 is a diagram showing a STDP (Spike-Timing Dependent Plasticity) algorithm.

Below, an STDP (Spike-Timing Dependent Plasticity) algorithm is described with reference to FIGS. 2 and 10. A signal received through the bit line BL1 corresponds to a synaptic potential. An STDP to be described later is implemented using a signal provided to the bit line BL2 and having a time interval with the signal received through the bit line BL1.

Figure 12:
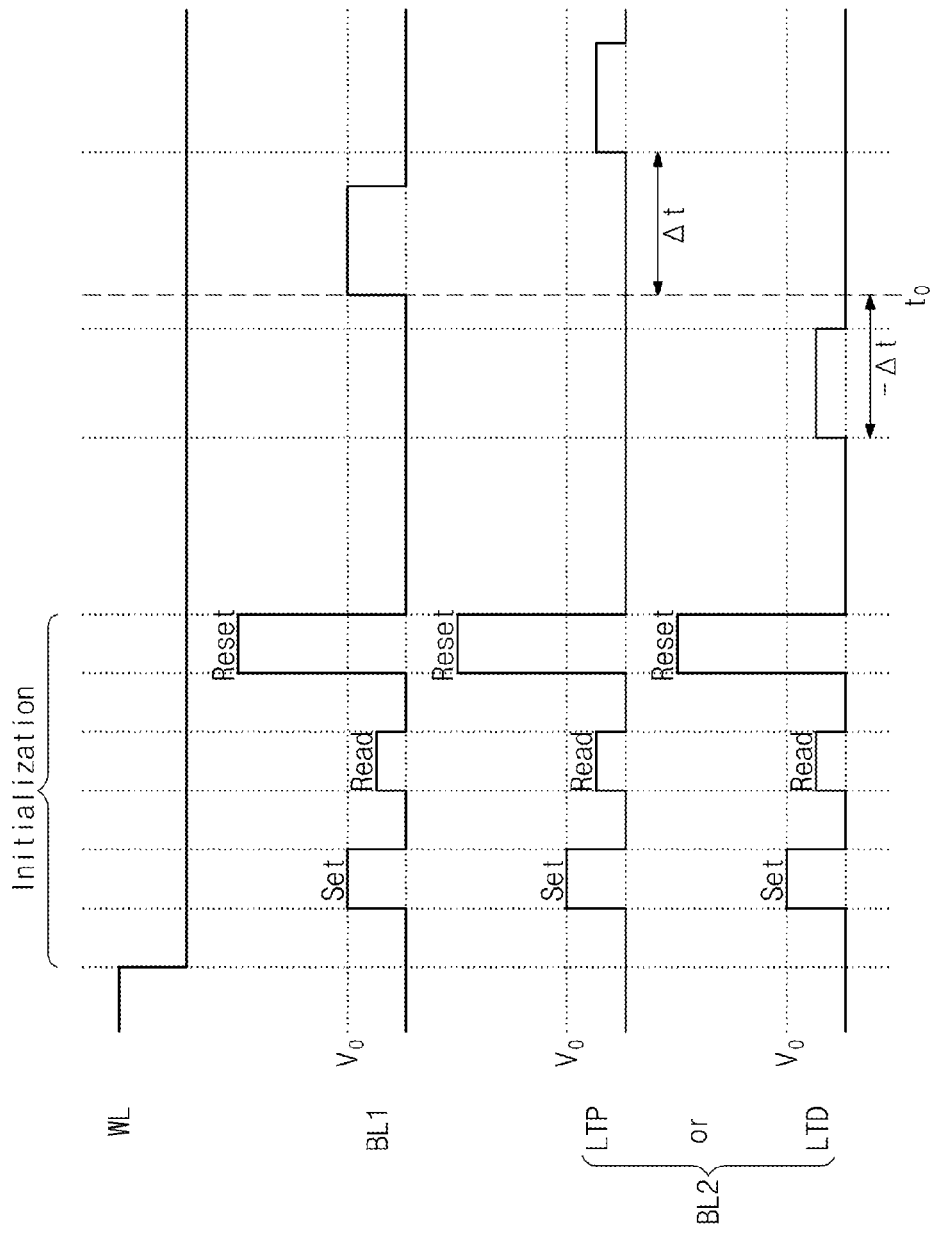
FIG. 12 is a timing diagram for implementing an STDP (Spike-Timing Dependent Plasticity) algorithm using a synapse circuit shown in FIG. 10, according to an example embodiment.
Figure 13:
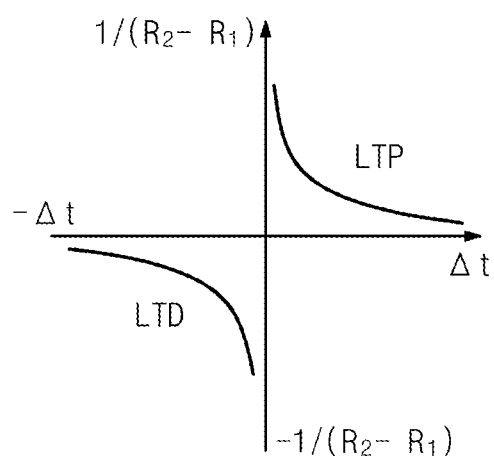
FIG. 13 is a diagram showing an STDP graph implemented using a synapse circuit shown in FIG. 10, according to an example embodiment.

FIG. 12 is a timing diagram for implementing an STDP algorithm using a synapse circuit shown in FIG. 10. FIG. 13 is a diagram showing an STDP graph implemented using a synapse circuit shown in FIG. 10.

Referring to FIGS. 10 to 13, a voltage at a word line shared by two phase change memory cells is maintained at a low value. Two phase change memory cells, each connected to different bit lines, are initialized to have the same high resistance value (e.g., an amorphous state). A voltage Vo (=$V_{BL1}$) is applied to a phase change memory cell connected to a bit line BL1 to have a sufficiently low resistance value (e.g., a crystalline state). This value may be used as a reference. A voltage $V_{BL2}$ having a positive or negative time interval with the voltage V0 applied to the bit line BL1 is applied to a phase change memory cell connected to a bit line BL2. At this time, a resistance value of the phase change memory cell connected to the bit line BL2 is larger than the resistance value of the phase change memory cell connected to the bit line BL1 by setting a level of the voltage $V_{BL2}$ to increase or decrease in proportion to a time different $\Delta t$.

For example, if the voltage $V_{BL2}$ applied to the bit line BL2 is set to ($V_{BL1}-\Delta t^2$), $V_{BL1}$ is equal to $V_{BL2}$ when a time interval between $V_{BL1}$ and $V_{BL2}$ is '0'. At this time, since a resistance difference between memory cells is '0', conductivity is theoretically infinite (refer to FIG. 13).

In the event that a time interval occurs between $V_{BL1}$ and $V_{BL2}$, LTD (Long-Term Depression) and LTP (Long-Term Potentiation) algorithms may be implemented. The LTP algorithm is implemented when $V_{BL2}$ is input later than that of $V_{BL1}$ ($\Delta t>0$). At this time, since the voltage $V_{BL1}$ applied to the memory cell connected to the bit line BL1 is always higher than the voltage $V_{BL2}$ that is applied to the memory cell connected to the bit line BL2, a resistance value R2 is always larger than a resistance value R1. Since conductivity being reciprocal to (R2−R1) is decreased, it is possible to implement the LTP algorithm shown in FIG. 13.

According to an example embodiment, the LTD algorithm is implemented when $V_{BL2}$ is input faster than $V_{BL1}$ ($\Delta t<0$). Like the LTP, since the voltage $V_{BL1}$ applied to the memory cell connected to the bit line BL1 is always higher than $V_{BL2}$ that is applied to the memory cell connected to the bit line BL2, a resistance value R2 is always larger than a resistance value R1, and the conductivity being reciprocal to (R2−R1) is decreased. Also, it is possible to implement the LTP algorithm shown in FIG. 13 by implementing a circuit (not shown) to have a negative conductivity value. At this time, a negative conductivity value is used to deduct a graph (−1/(R2−R1)) having a negative value shown in FIG. 13. That is, that the circuit (not shown) having a negative conductivity value does not mean that a synapse circuit physically has a negative conductivity value.

Figure 14:
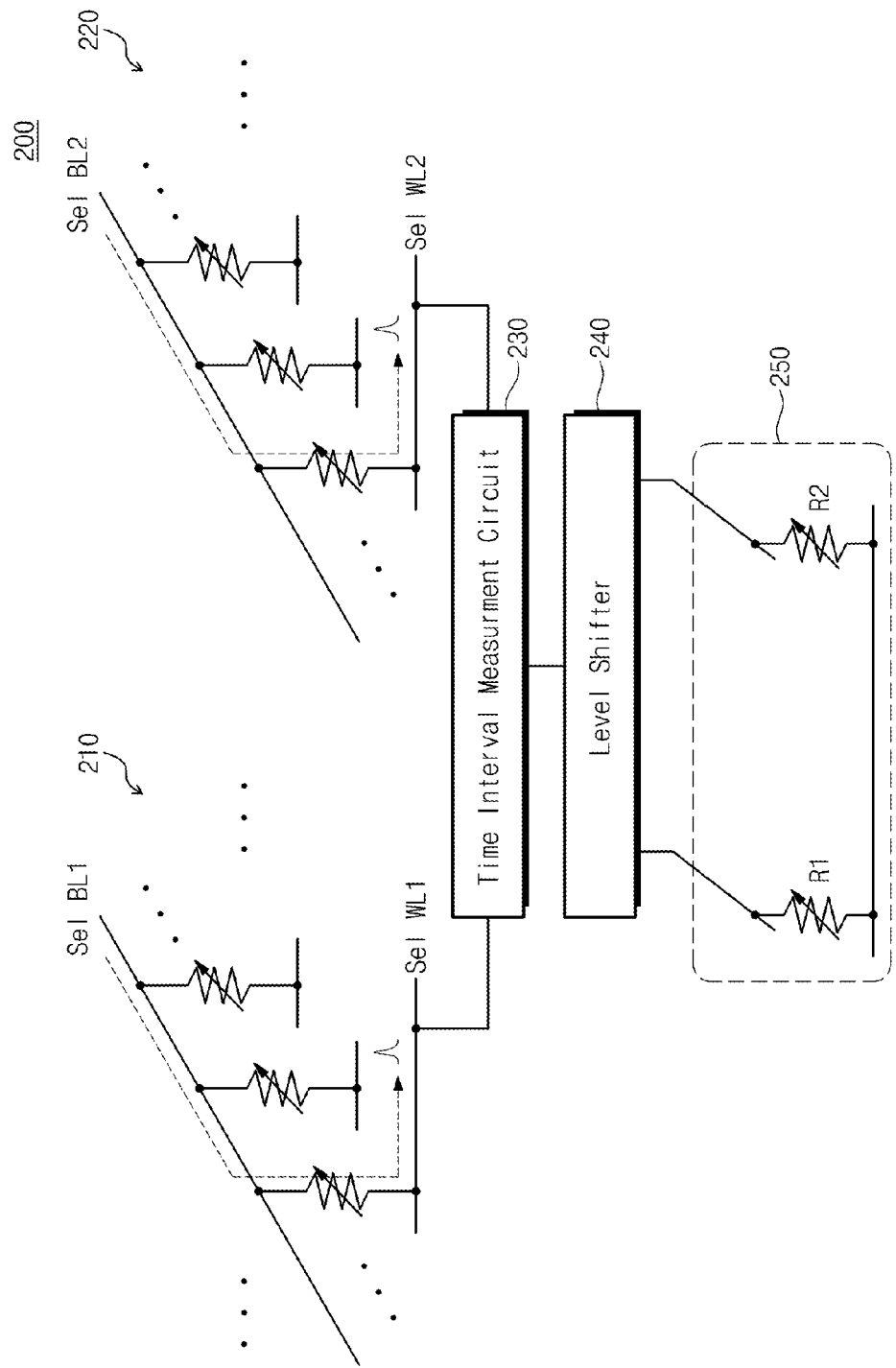
FIG. 14 is a diagram schematically illustrating a neuromorphic system 200 which receives a plurality of neuron spiking pulses to implement an LTDP algorithm, according to an example embodiment.

FIG. 14 is a diagram schematically illustrating a neuromorphic system 200 which receives a plurality of neuron spiking pulses to implement an LTDP algorithm, according to an example embodiment of the inventive concepts. First and second neuron spiking pulse generating circuits 210 and 220 are implemented as shown in FIG. 8. First and second neuron spiking pulses generated from the first and second neuron spiking pulse generating circuits 210 and 220 are provided to a time interval measurement circuit 230.

According to an example embodiment, the time interval measurement circuit 230 measures a time interval $\Delta t$ between the first neuron spiking pulse and the and second neuron spiking pulse. The time interval measurement circuit 230 controls a level shifter 240 so as to adjust levels of the first and second neuron spiking pulses in proportion to the time interval or such that the first and second neuron spiking pulses are output with a desired time interval. In FIG. 14, there is illustrated an example embodiment where a time interval between the first second neuron spiking pulse and the second neuron spiking pulse is adjusted by the time interval measurement circuit 230. However, the inventive concepts are not limited thereto. For example, the first and second neuron spiking pulses may be generated with a desired time interval without the time interval measurement circuit 230 by adjusting voltages applied to bit lines and word lines.

According to an example embodiment, the level shifter 240 adjusts levels of the first and second neuron spiking pulses by applying a positive or negative voltage to the first and second neuron spiking pulses output with a time interval.

According to an example embodiment, a synapse circuit 250 receives the first and second neuron spiking pulses shifted from the level shifter 240 to implement an LTDP algorithm. The LTDP algorithm is implemented according to the above-described example method, and a description thereof is thus omitted.

According to an example embodiment of the inventive concepts, it is possible to implement a neuron spiking using, for example, a single cell in a phase change cell array and to implement an STDP algorithm using, for example, two cells. Thus, high integration and low consumption are accomplished as compared to a CMOS based neuromorphic circuit.

While the inventive concept has been described with reference to example embodiments, it will be apparent to those skilled in the art that various changes and modifications may be made without departing from the spirit and scope. Therefore, it should be understood that the above embodiments are not limiting, but illustrative.

What is claimed is:

1. A method of generating neuron spiking pulses in a neuromorphic system, comprising:
    floating one or more selected bit lines connected to target cells, the target cells having a first state, from among a plurality of memory cells arranged at intersections of a plurality of word lines and a plurality of bit lines; and
    stepwisely increasing voltages applied to unselected word lines connected to unselected cells, the unselected cells having a second state, from among memory cells connected to the one or more selected bit lines other than the target cells having the first state.

2. The method of claim 1, further comprising:
    setting cells connected to unselected bit lines other than the one or more selected bit lines to the first state before the increasing.

3. The method of claim 1, further comprising:
    setting all cells connected to the one or more selected bit lines to the second state;
    and setting the target cells to the first state.

4. The method of claim 3, wherein the first state is different from the second state.

5. The method of claim 4, wherein the plurality of memory cells are phase change memory cells.

6. The method of claim 5, wherein the first state is an amorphous state of a phase change material included in each memory cell and the second state is a crystal state of the phase change material.

7. The method of claim 6, wherein the plurality of memory cells transitions from an amorphous state to a crystalline state when the neuron spiking pulse has been generated.

8. The method of claim 4, wherein the first state is a high resistance state and the second state is a low resistance state.

9. The method of claim 1, further comprising:
detecting whether the neuron spiking pulses are output from selected word lines connected to the target cells.

10. The method of claim 9, wherein the increasing and the detecting are iterated until the neuron spiking pulses are generated.

11. The method of claim 9, wherein the detecting comprises determining that one of the voltages applied to the unselected word lines is greater than a sum of the voltage applied to the one or more selected bit lines and voltage drops in unselected memory cells.

12. The method of claim 1, wherein the floating and the increasing are performed contemporaneously.

13. The method of claim 1, wherein at least one of the plurality of memory cells comprises a diode for reducing a current leakage.

14. A neuromorphic system implementing method comprising:

floating one or more selected bit lines connected to target cells, the target cells having a first state, from among a plurality of memory cells arranged at intersections of a plurality of word lines and a plurality of bit lines;

stepwisely increasing voltages applied to unselected word lines connected to unselected cells, the unselected cells having a second state, from among cells connected to the one or more selected bit lines other than the target cells having the first state, to generate neuron spiking pulses; and providing first and second neuron spiking pulses selected from the neuron spiking pulses to a synaptic circuit including first and second memory cells with a time interval, to implement an STDP (Spike-Timing Dependent Plasticity) algorithm.

15. The method of claim 14, wherein the memory cells are phase change memory cells.

16. The method of claim 15, wherein the first state is an amorphous state of a phase change material included in each memory cell, and the second state is a crystal state of the phase change material.

* * * * *

UNITED STATES PATENT AND TRADEMARK OFFICE
CERTIFICATE OF CORRECTION

PATENT NO. : 9,710,747 B2
APPLICATION NO. : 14/328359
DATED : July 18, 2017
INVENTOR(S) : Daehwan Kang et al.

It is certified that error appears in the above-identified patent and that said Letters Patent is hereby corrected as shown below:

On the Title Page

Item (54):
Replace "NEUROMOPHIC SYSTEM AND CONFIGURATION METHOD THEREOF" with "NEUROMORPHIC SYSTEM AND CONFIGURATION METHOD THEREOF"

Signed and Sealed this
Twenty-fourth Day of October, 2017

Joseph Matal
*Performing the Functions and Duties of the
Under Secretary of Commerce for Intellectual Property and
Director of the United States Patent and Trademark Office*